United States Patent
Brown et al.

(10) Patent No.: US 10,572,507 B2
(45) Date of Patent: Feb. 25, 2020

(54) COORDINATION OF POINT-IN-TIME COPY IN ASYNCHRONOUS MIRROR ENVIRONMENT DURING CONSISTENCY GROUP FORMATION

(71) Applicant: International Business Machines Corporation, Armonk, NY (US)

(72) Inventors: Theresa M. Brown, Tucson, AZ (US); Nicolas M. Clayton, Cheshire (GB); Theodore T. Harris, Jr., Tucson, AZ (US); Kevin J. Lin, Tucson, AZ (US); Gregory E. McBride, Vail, AZ (US); Carol S. Mellgren, Tucson, AZ (US); Matthew Sanchez, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 15/603,736

(22) Filed: May 24, 2017

(65) Prior Publication Data
US 2018/0341694 A1 Nov. 29, 2018

(51) Int. Cl.
| G06F 7/00 | (2006.01) |
| G06F 17/00 | (2019.01) |
| G06F 16/27 | (2019.01) |
| H04L 29/08 | (2006.01) |

(52) U.S. Cl.
CPC ........ *G06F 16/273* (2019.01); *H04L 67/1095* (2013.01); *H04L 67/1097* (2013.01)

(58) Field of Classification Search
CPC ............... G06F 16/273; G06F 11/1446; G06F 11/2074; G06F 2201/84; G06F 11/1658; G06F 11/2028; H04L 67/1095; H04L 67/1097
See application file for complete search history.

(56) References Cited

U.S. PATENT DOCUMENTS

| 5,592,618 A * | 1/1997 | Micka ................. G06F 11/2074 711/162 |
| 7,472,173 B2 | 12/2008 | Maruyama et al. |
| 7,610,318 B2 | 10/2009 | Bartfai et al. |
| (Continued) | | |

OTHER PUBLICATIONS

Clayton, Nick, IBM, Global Mirror Whitepaper, version V2, Sep. 15, 2008, 30 pages.

*Primary Examiner* — Azam M Cheema
(74) *Attorney, Agent, or Firm* — Terrile, Cannatti & Chambers, LLP; Stephen A. Terrile

(57) ABSTRACT

A method, system and computer-usable medium are disclosed for improved point-in-time copying of data within an asynchronous data mirroring environment comprising: receiving a request to initiate an asynchronous data mirroring operation associated with a first point-in-time copying process; processing a first set of establish data to generate a point-in-time establish reservation, the first set of establish data associated with the first point-in-time copying process establish; using the point-in-time establish reservation to generate a second set of establish data if the second point-in-time copying process can be performed; using the second set of establish data to initiate a second point-in-time copying process; and, tracking establish operations in progress between the first point-in-time copying process and the second point-in-time copying process.

17 Claims, 7 Drawing Sheets

(56) References Cited

U.S. PATENT DOCUMENTS

| | | |
|---|---|---|
| 7,668,810 B2 | 2/2010 | Davis et al. |
| 7,873,864 B2 | 1/2011 | Benhase et al. |
| 7,904,684 B2 | 3/2011 | Werner et al. |
| 8,335,766 B2 | 12/2012 | Thompson et al. |
| 8,484,655 B2 | 7/2013 | Ripberger |
| 8,667,497 B2 | 3/2014 | Ripberger |
| 8,839,262 B2 | 9/2014 | Ripberger |
| 8,990,263 B2 | 3/2015 | Clayton et al. |
| 8,990,264 B2 | 3/2015 | Clayton et al. |
| 9,063,997 B2 | 6/2015 | Clayton et al. |
| 9,251,231 B2 | 2/2016 | Benhase et al. |
| 2012/0150811 A1 * | 6/2012 | Thompson .......... G06F 11/1446 707/658 |
| 2012/0151492 A1 | 6/2012 | Ripberger |
| 2012/0254114 A1 | 10/2012 | Gundy et al. |
| 2012/0317581 A1 | 12/2012 | Ripberger |
| 2013/0246354 A1 | 9/2013 | Clayton et al. |
| 2013/0246367 A1 | 9/2013 | Clayton et al. |
| 2014/0143786 A1 | 5/2014 | Ripberger |
| 2015/0081628 A1 | 3/2015 | Brown et al. |
| 2015/0301910 A1 * | 10/2015 | Sathyanarayana .......................... G06F 11/1658 714/4.11 |

* cited by examiner

COORDINATION OF POINT-IN-TIME COPY IN ASYNCHRONOUS MIRROR ENVIRONMENT DURING CONSISTENCY GROUP FORMATION

BACKGROUND OF THE INVENTION

Field of the Invention

The present invention relates in general to the field of computers and similar technologies, and in particular to software utilized in this field. Still more particularly, it relates to a method, system and computer-usable medium for improved point-in-time copying of data within an asynchronous data mirroring environment.

Description of the Related Art

The storage of data in large organizations is important, both for reliability of the data and for the ability to recover data in the event of a disaster involving hardware failure. Mirroring is one form of disaster recovery commonly used in network storage systems. In mirroring, data written to a primary storage volume is also written to a secondary storage volume. The volumes may be logical storage volumes of the same or different storage devices, such as hard disk drives. In synchronous mirroring, data written to the primary storage volume is simultaneously written to the secondary storage volume. The data is not considered as having been written to the primary storage volume unless it has also been written to the secondary storage volume.

By comparison, in asynchronous mirroring, data written to the secondary storage volume is written at some point in time after the data has been written to the primary storage volume. The data is considered as having been written to the primary storage volume even before it has been written to the secondary storage volume. Asynchronous mirroring permits the secondary storage volume to be located at a significant distance away from the primary storage volume, without incurring the performance penalty that results with synchronous mirroring when the volumes are located at a significant distance away from each other.

One aspect of mirroring is creating a point-in-time copy of data from a source volume to a target volume. A point-in-time copy can also be made by first making a logical copy of the data stored in the source volume. The resulting logical copy can then be copied to the target volume at a later time, which effectively defers the physical copying of the source data. This logical copy operation is performed to minimize the time during which the target and source volumes are inaccessible. An example of such a point-in-time copying operation is FlashCopy®, provided by International Business Machines (IBM), which makes it possible to create, nearly instantaneously, point-in-Time copies of entire logical volumes or data sets.

However, issues can arise when the target of the point-in-time copy is the primary volume in an asynchronous (e.g., Extended Remote Copy or Global Mirror, both provided by IBM) relationship with a target of the point-in-time copy of a secondary volume.

SUMMARY OF THE INVENTION

A method, system and computer-usable medium are disclosed for improved point-in-time copying of data within an asynchronous data mirroring environment comprising: receiving a request to initiate an asynchronous data mirroring operation associated with a first point-in-time copying process; processing a first set of establish data to generate a point-in-time establish reservation, the first set of establish data associated with the first point-in-time copying process establish; using the point-in-time establish reservation to generate a second set of establish data if the second point-in-time copying process can be performed; using the second set of establish data to initiate a second point-in-time copying process; and, tracking establish operations in progress between the first point-in-time copying process and the second point-in-time copying process.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
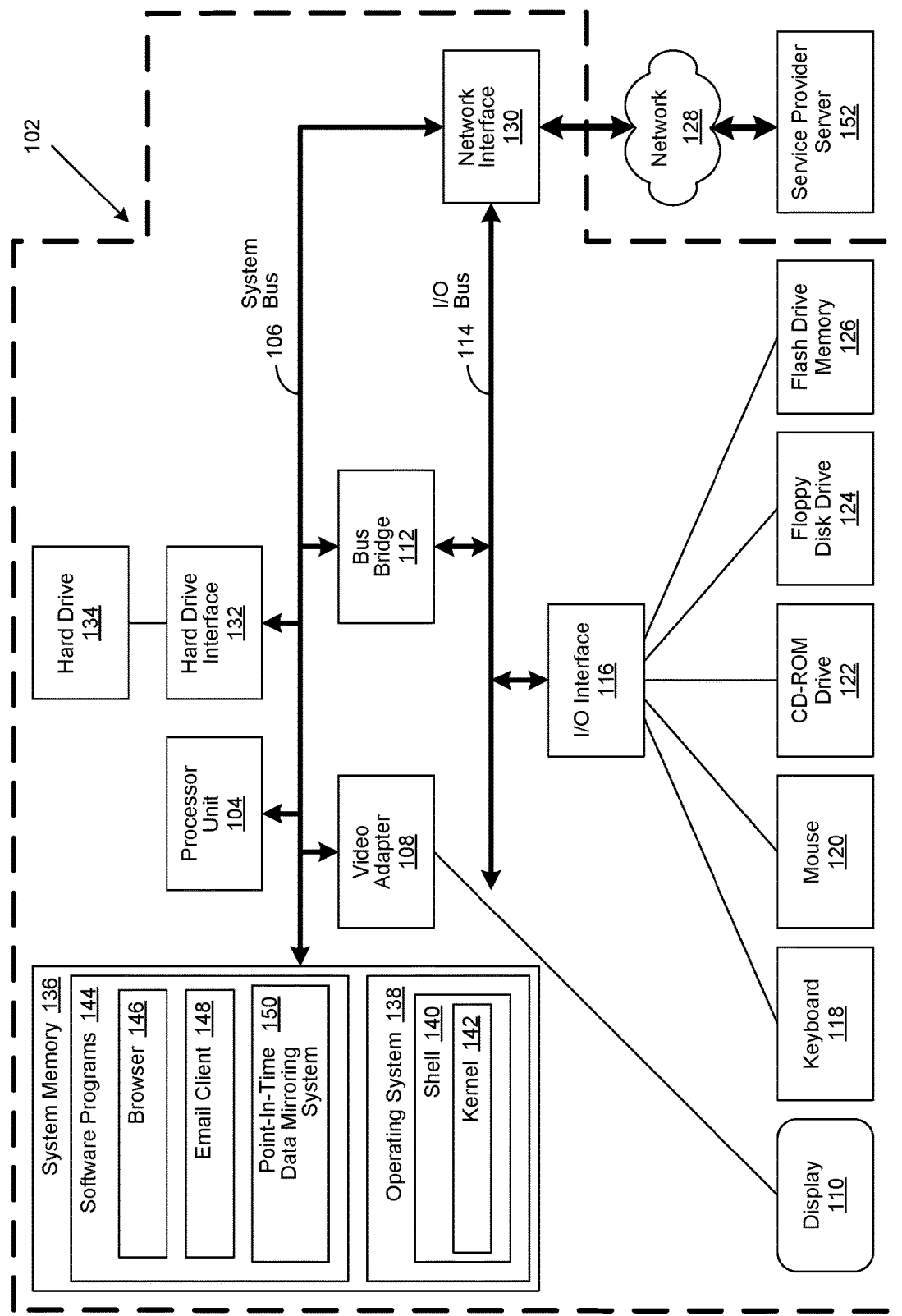
FIG. 1 shows an exemplary client computer in which the present invention may be implemented.

A method, system and computer-usable medium are disclosed for improved point-in-time copying of data within an asynchronous data mirroring environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a point-in-time data mirroring system 150. In these and other embodiments, the point-in-time data mirroring system 150 includes code for implementing the processes described hereinbelow. In one embodiment, client computer 102 is able to download the point-in-time data mirroring system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
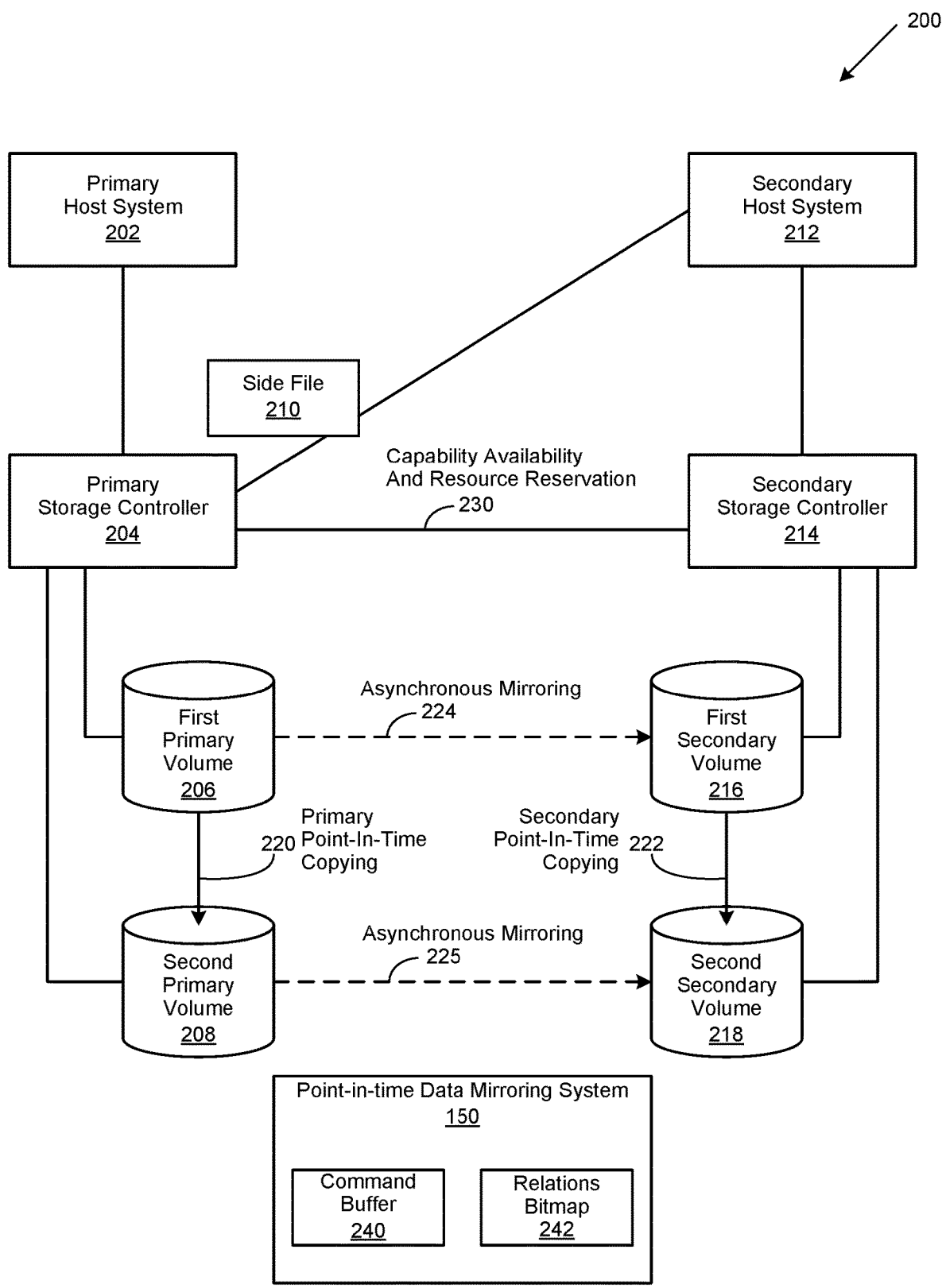
FIG. 2 is a simplified block diagram of a system for improved point-in-time copying of data within an asynchronous data mirroring environment.

FIG. 2 is a block diagram of an environment 200 for improved point-in-time copying of data within an asynchronous data mirroring environment implemented in accordance with an embodiment of the invention. In this embodiment, the point-in-time data mirroring environment 200 includes a primary host system 202, a primary storage controller (or storage controller device) 204, a first primary volume 206, and a second primary volume 208. The primary host system 202, the primary storage controller 204, and the first and second primary volumes 206 and 208 may be located in a local manner in relation to one another. For example, all these components may be located in the same room or the same building.

As shown in FIG. 2, the environment 200 also includes a secondary host system 212, a secondary storage controller 214, a first secondary volume 216, and a second secondary volume 218. The secondary host system 212, the secondary controller 214, and the first and second secondary volumes 216 and 218 may also be located in a local manner in relation to one another. However, in various embodiments, the secondary host system 212, the secondary controller 214, and the first and second secondary volumes 216 and 218 may be located remote to the primary host system 202, the primary storage controller 204, and the first and second primary volumes 206 and 208. For example, the former components may be located in a different building, a different city, a different state, or even in a different country than the latter components. In certain embodiments, the point-in-time mirroring system 150 may execute on some or all of the primary host system 202, primary storage controller 204, the secondary host system 212 and the secondary storage controller 214.

As depicted in FIG. 2, a solid line between two components indicates that the components may directly communicate with one another, such as over a network or a direct cable connection, without having to pass communication through any other component. A dashed line indicates an operation performed in relation to the latter component with reference to the former component. As likewise depicted in FIG. 2, the terms "primary" and "secondary" are primarily used herein to distinguish the components on the left-hand side of FIG. 2 from the components on the right-hand side of FIG. 2. In certain embodiments, the secondary components on the right-hand side of FIG. 2 may be considered as subordinate to the primary components on the left-hand side of FIG. 2. As likewise depicted in FIG. 2, the primary components may also be referred to as the local components and the secondary components may also be referred to as the remote components. In certain embodiments the point-in-time data mirroring system 150 includes a command buffer 240. In certain embodiments the point-in-time data mirroring system 150 includes a relations bitmap 242.

In various embodiments, the primary host system 202 includes one or more computing devices, such as server computer devices, which process information by writing data to, updating data on, and reading data from the first primary volume 206. In these embodiments, the primary host system 202 interacts with the primary storage controller 204, which in turn interacts with the first and second primary volumes 206 and 208. In various embodiments, the first and second primary volumes 206 and 208 may be logical storage volumes on the same or different storage devices, such as hard disk drives, arrays of hard disk drives, and so forth. In one embodiment, the first primary volume 206 is periodically point-in-time copied 220 to the second primary volume 208, resulting in a point-in-time copy of the first primary volume 206 being made to the second primary volume 208.

In these and other embodiments, the primary storage controller 204 may interact with the secondary host system 212 in various ways. For example, in one embodiment, the primary storage controller 204 may store data in a side file 210, which is then retrieved by the secondary host system 212. As used herein, the side file 210 refers to a logical data file that is stored in various places, including a volume of a storage device, in the cache of the primary storage controller 204, a non-volatile storage device, and so forth. In another embodiment, the primary storage controller 204 may directly communicate with the secondary host system 212 without using the side file 210. Additional details of the use of the side file 210 are provided in more detail hereinbelow.

In certain embodiments, the secondary host system 212 may also include one or more computing devices described in greater detail herein. In one embodiment, the secondary host system 212 is at least in part responsible for managing an asynchronous mirroring 224 relationship between the first primary volume 206 and the first secondary volume 216 such that the first primary volume 206 is asynchronously mirrored 224 to the first secondary volume 216. In one embodiment, the secondary host system 212 is at least in part responsible for managing an asynchronous mirroring relationship between the second primary volume 208 and the second secondary volume 218 such that the second primary volume 208 is asynchronously mirrored 225 to the second secondary volume 218.

For example, when the primary host system 202 performs a write or update operation, the primary host system 202 sends the operation to the primary storage controller 204. In turn, the primary storage controller 204 performs the operation in relation to the first primary volume 206 and stores the operation in the side file 210. The primary storage controller 204 then signals back to the primary host system 202 that the operation has been completed. At some later point in time, the secondary host system 212 retrieves the operation from the side file 210 and interacts with the secondary storage controller 214 to cause the operation to be performed in relation to the first secondary volume 216. As such, the current contents of the first secondary volume 216 mirror the past contents of the first primary volume 206.

As with the primary host system 202, the primary storage controller 204, and the first and second primary volumes 206 and 208, the secondary host system 212 interacts with the secondary storage controller 204, which in turn interacts with the first and second secondary volumes 216 and 218. Likewise, as with the first and second primary volumes 206 and 208, the first and second secondary volumes 216 and 218 may be logical storage volumes on the same or different storage devices. In various embodiments, the storage devices implementing the first and second secondary volumes 216 and 218 may be hard disk drives, arrays of hard disk drives, and so forth, and are not the same storage devices implementing the first and second primary volumes 206 and 208.

In various embodiments, the first secondary volume 216 may periodically be point-in-time copied to the second secondary volume 218. For example, it may be determined that the configuration and state of the volumes 206, 208, 216, and 218 permit point-in-time copying 220 of the first primary volume 206 to the second primary volume 208 and point-in-time copying 222 of the first secondary volume 216 to the second secondary volume 218, as is described in greater detail herein. Thereafter, the primary storage controller 204 initiates point-in-time copying 220 from the first primary volume 206 to the second primary volume 208, reports back to the primary host system 202 that point-in-time copying 220 has succeeded, and writes a point-in-time copy operation to the side file 210.

Thereafter, the secondary host system 212 reads the point-in-time copy operation from the side file 210 at some later point in time and instructs the secondary storage controller 214 to generate a point-in-time copy of the first secondary volume 216 on the second secondary volume 218. In response, the secondary storage controller 214 initiates point-in-time copying 222 from the first secondary volume 216 to the second secondary volume 218. Once the point-in-time copying 222 has been completed, the current contents of the second secondary volume 218 mirror the past contents of the second primary volume 208.

Accordingly, three logical data mirroring operations are depicted in FIG. 2. First, the first primary volume 206 is point-in-time copied 220 to the second primary volume 208. Second, the first primary volume 206 is asynchronously mirrored 224 to the first secondary volume 216. Third, the first secondary volume 216 is point-in-time copied 222 to the second secondary volume 218.

In various embodiments, whenever a point-in-time copy is established between the first primary volume 206 and the second primary volume 208, a second point-in-time copy must be established at the same logical time in order to maintain consistency of the data stored in the second secondary volume 218. As used herein, a point-in-time copy "establish" broadly refers to any operation or process related to establishing a logical point-in-time relationship between a source volume (e.g., the first primary volume 206) and a target volume (e.g., the first secondary volume 216).

Those of skill in the art will be aware that various approaches are known for achieving such point-in-time copy establishes. For example, Extended Remote Copy® (XRC), provided by International Business Machines (IBM), has algorithms to ensure that a FlashCopy (i.e., a point-in-time copy) establish is attempted at the proper time to keep the source and target volumes consistent. However, since the point-in-time copy establish associated with the primary point-in-time copying 220 process could have been completed at an earlier time, there is no way to cause its failure should the establish associated with the secondary point-in-time copying 222 process fail.

Skilled practitioners of the art will be aware that various reasons may cause the secondary point-in-time copying 222 to fail. For example, the resources needed to support the secondary point-in-time copying 222 establish may not be available or present. As another example, the number of supported point-in-time copying instances may be exceeded. As yet another example, there may be a problem accessing all of the needed storage control structures. As still another example, the establishment of a point-in-time copy may not be allowed, as doing so would violate a configuration restriction such as causing a cascading configuration.

In various embodiments, this issue is addressed by ensuring that the secondary point-in-time copying 222 establish succeeds prior to the primary point-in-time copying 220 establish is allowed return success. In these embodiments, the primary storage controller 204 and the secondary storage controller 214 are communicatively coupled 230 to communicate the success of the secondary point-in-time copying 222 establish. In one embodiment, the primary storage controller 204 and the secondary storage controller 214 are communicatively coupled by a Fiber Channel link familiar to those of skill in the art. In another embodiment, the primary storage controller 204 and the secondary storage controller 214 are communicatively coupled through the secondary host system 212 over an existing Fiber Channel link through the implementation of a message/response protocol initiated by the primary storage controller 204. In yet another embodiment, the primary storage controller 204 and the secondary storage controller 214 are communicatively coupled through the implementation of a TCP/IP communication session. In these and other embodiments, the primary storage controller 204 and the secondary storage controller 214 are communicatively coupled through a different logical communication path than the one used by asynchronous mirror operations.

In these and other embodiments, a reservation for resources to be used in the secondary point-in-time copy 222 is synchronously established with the primary point-in-time copying 220 establish. In certain embodiments, the reservation is performed over a Peer-To-Peer Remote Copy (PPRC) link familiar to those of skill in the art. In these embodiments, the checking of the point-in-time copying bitmaps, which determines where the data is during the secondary point-in-time copying 222 when there is a data write to the first secondary volume 216, is delayed until the new establish check-in operation uses the reservation.

As such, the reservation effectively creates a point-in-time copying relationship with the first secondary volume 216, but does not start any read or write processing until sometime later when the secondary point-in-time copying 222 process begins. Once the point-in-time copying 222 establish on the first secondary volume 216 is initiated, it then utilizes the reservation to begin the secondary point-in-time copying 222 to the second secondary volume 218. Should the point-in-time copying reservation 230 establish on the first secondary volume 216 fail, then the point-in-time copying 220 establish on the first primary volume 206 will likewise be failed. From the foregoing, it will be appreciated that when the point-in-time copying reservation 230 succeeds, then it can be anticipated that the point-in-time establish 222 will likewise succeed. As a result, the primary point-in-time establish 220 is allowed to complete successfully. In one embodiment, the failure maintains the Preserve Mirror Required concept familiar to those of skill in the art.

In various embodiments, the establish reservation receives the needed data structures and subsequently ensures there are no problems with the reservation. In certain of these embodiments, the reservation would prevent another point-in-time copy establish from exhausting resources or causing a cascading configuration. Thus, when the establish check-in operation occurs, the point-in-time copying instance has an improved chance of success.

In various embodiments, the point-in-time copy establish reservation operation and the point-in-time copy establish check-in operation is coordinated through the use of a point-in-time copy sequence number. In these embodiments, there may be multiple point-in-time copies occurring at different times across the same set of volumes, such as would be done for data set level point-in-time copying. In certain embodiments, the point-in-time copy sequence number is generated by the primary storage controller 204 and is provided via the PPRC link. As a result, the point-in-time copy sequence number associated with an establish check in operation allows the primary storage controller 204 to know which reservation to convert to a normal point-in-time copy instance.

Skilled practitioners of the art will recognize that the side file 210, and its associated entries, may be lost due to a session suspension. As a result, the point-in-time copy establish for a check-in operation may not occur. Accordingly, these point-in-time copying relationships need to be cancelled as they consume resources on the secondary storage controller 214, resulting in the need for a way to internally cancel a reservation. In one embodiment, this need is addressed by estimating the time the check-in operation should occur in the future, based upon the amount of time the asynchronous mirroring 224 process is running behind the primary point-in-time copying 220 process.

In this embodiment, the asynchronous mirroring 224 operation will periodically tell the secondary storage controller 214 how long it is running behind, such that the secondary storage controller 214 can relate a cancellation time for a point-in-time copy establish reservation. In another embodiment, an algorithm is based upon the point-in-time copying sequence number. In this embodiment, the sequence number is always increasing. Therefore, any point-in-time establish reservations with an earlier sequence number may be cancelled.

In certain embodiments, an asynchronous data mirroring operation (e.g., a Global Mirror operation) has two phases: a draining phase and an idle phase. During the draining phase of the asynchronous data mirroring operation, a consistency group is in progress/consistency group in progress (CGIP). The idle phase corresponds to when the volumes in a session are being copied via the asynchronous data mirroring operation. Thus, the idle phase corresponds to when a global copy operation is functioning properly.

When functioning in the asynchronous data mirroring operation idle phase, the volumes in the session have out-of-sync (OOS) information allocated that is recording new changes and also being used to determine which tracks to synchronize the secondary. In certain embodiments, the last consistency group is protected by the asynchronous point-in-time copy operation point-in-time copy at the secondary. In certain embodiments, the OOS information may be stored within an OOS bitmap.

When functioning in the asynchronous data mirroring operation draining phase, the volumes in the session maintain Change Recording (CR) information and OOS information. The OOS information includes data for the current consistency group (i.e., the consistency group corresponding to the presently occurring point-in-time copy) that needs to be copied to the secondary. The CR information contains any new updates that should be considered the start of the next consistency group (i.e., the consistency group corresponding to a next subsequently occurring point-in-time copy). Data in the OOS information should be protected from being overwritten while the asynchronous data mirroring operation is operating in the draining phase, otherwise the consistency group could be compromised.

Certain aspects of the present disclosure include an appreciation that a challenge in supporting a point-in-time copy operation onto an asynchronous data mirroring operation while the asynchronous data mirroring operation is functioning in the draining phase, relates to protecting OOS/consistent data on the local components. Certain aspects of the present disclosure include an appreciation that a challenge in supporting a point-in-time copy operation onto an asynchronous data mirroring operation while the asynchronous point-in-time copy operation is functioning in the draining phase (in addition to protecting OOS/consistent data on the local), is the timing associated with a remote establish.

When a point-in-time copy establish operation is performed on the local components, the point-in-time copy establish operation cannot be committed at the remote volumes if the asynchronous data mirroring operation is in the process of draining a consistency group (CG). Any point-in-time copy command that arrives while the asynchronous data mirroring operation is in the draining phase should be considered part of a subsequent consistency group. If the asynchronous point-in-time copy information from the local components were to be committed at the remote components, the asynchronous data mirroring copy information would automatically become part of the current consistency group when the drain process completes and the consistency group was hardened (i.e., not allowing any reads or writes to the extent range so the point-in-time copy can be performed). For this reason, point-in-time copy reservations can be used. The point-in-time copy reservations are checked in when the asynchronous data mirroring operation finishes the drain process (whether the drain process completes successfully or fails). In certain embodiments, the point-in-time establish reservation is synchronously established with the first point-in-time copying process establish, such as over a Peer-To-Peer Remote Copy (PPRC) link.

Figure 3:
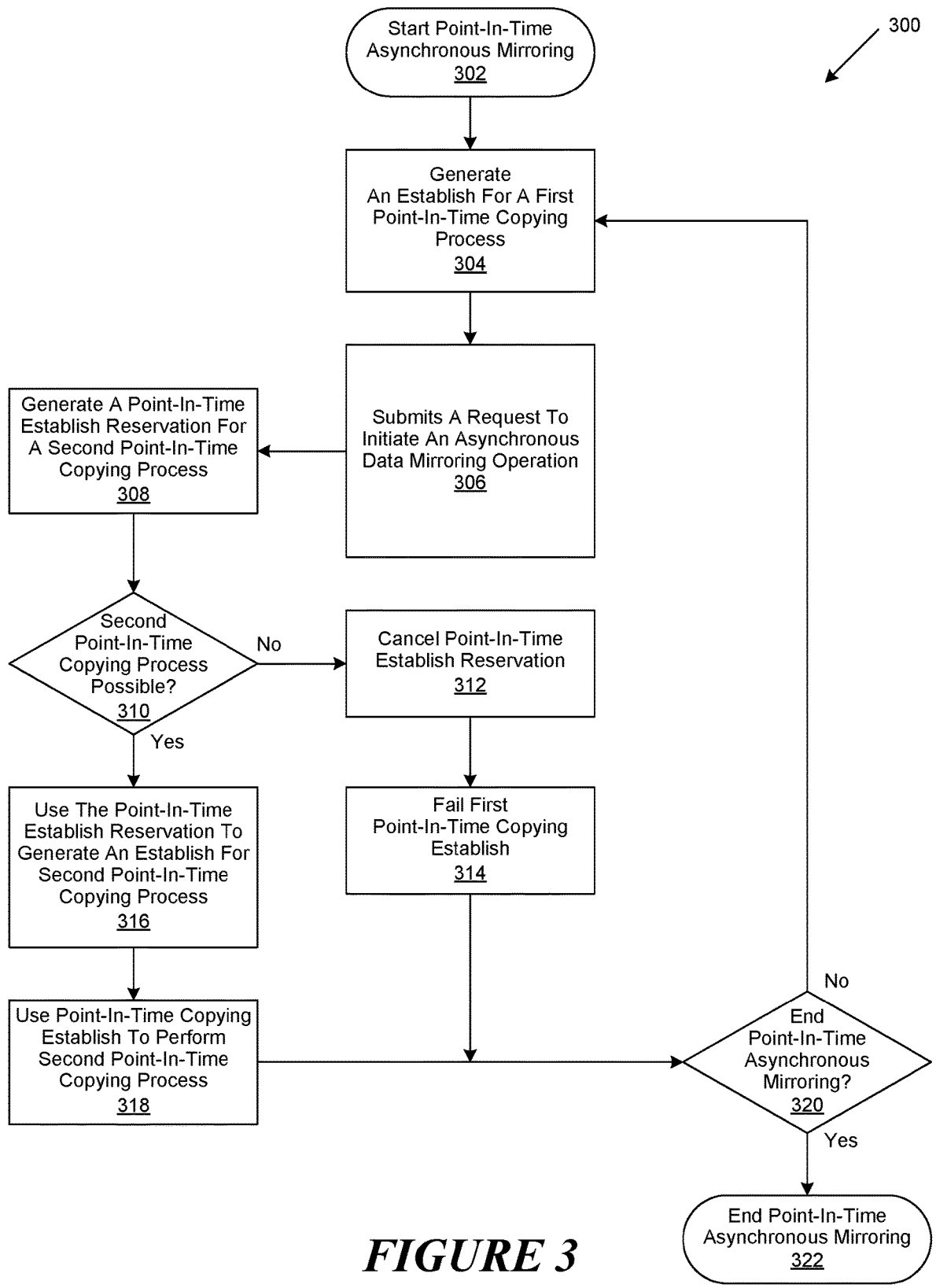
FIG. 3 is a generalized flowchart of improved point-in-time copying operations performed within an asynchronous data mirroring environment.

FIG. 3 is a generalized flowchart of improved point-in-time copying operations 300 performed within an asynchronous data mirroring environment implemented in accordance with an embodiment of the invention. In this embodiment, point-in-time copying and asynchronous data mirroring operations 300 are begun in step 302, followed by a primary storage controller generating a first establish for a first point-in-time copying operation in step 304. Once the first establish is generated, the primary storage controller submits a request in step 306 to initiate an asynchronous data mirroring operation associated with the first point-in-time copying process. In response, a point-in-time establish reservation, described in greater detail herein, is generated in step 308 for a second point-in-time copying process.

As likewise described in greater detail herein, a determination is then made in step 310 whether it is possible for the second point-in-time copying process to be successfully performed. If not, then the point-in-time establish reservation is cancelled in step 312 and the first point-in-time copy establish is failed in step 314. A determination is then made in step 320 whether to end point-in-time copying and asynchronous data mirroring operations. If not, then the process is continued, proceeding with step 304. Otherwise, point-in-time copying and asynchronous data mirroring operations are ended in step 322.

However, if it is determined in step 310 that it is possible for the second point-in-time copying process to be successfully performed, then the point-in-time establish reservation is used in step 316 to generate a check-in for the second point-in-time copying process. In turn, the check-in is then used in step 318 to perform the second point-in-time copying process. The process is then continued, proceeding with step 320.

Figure 4A:
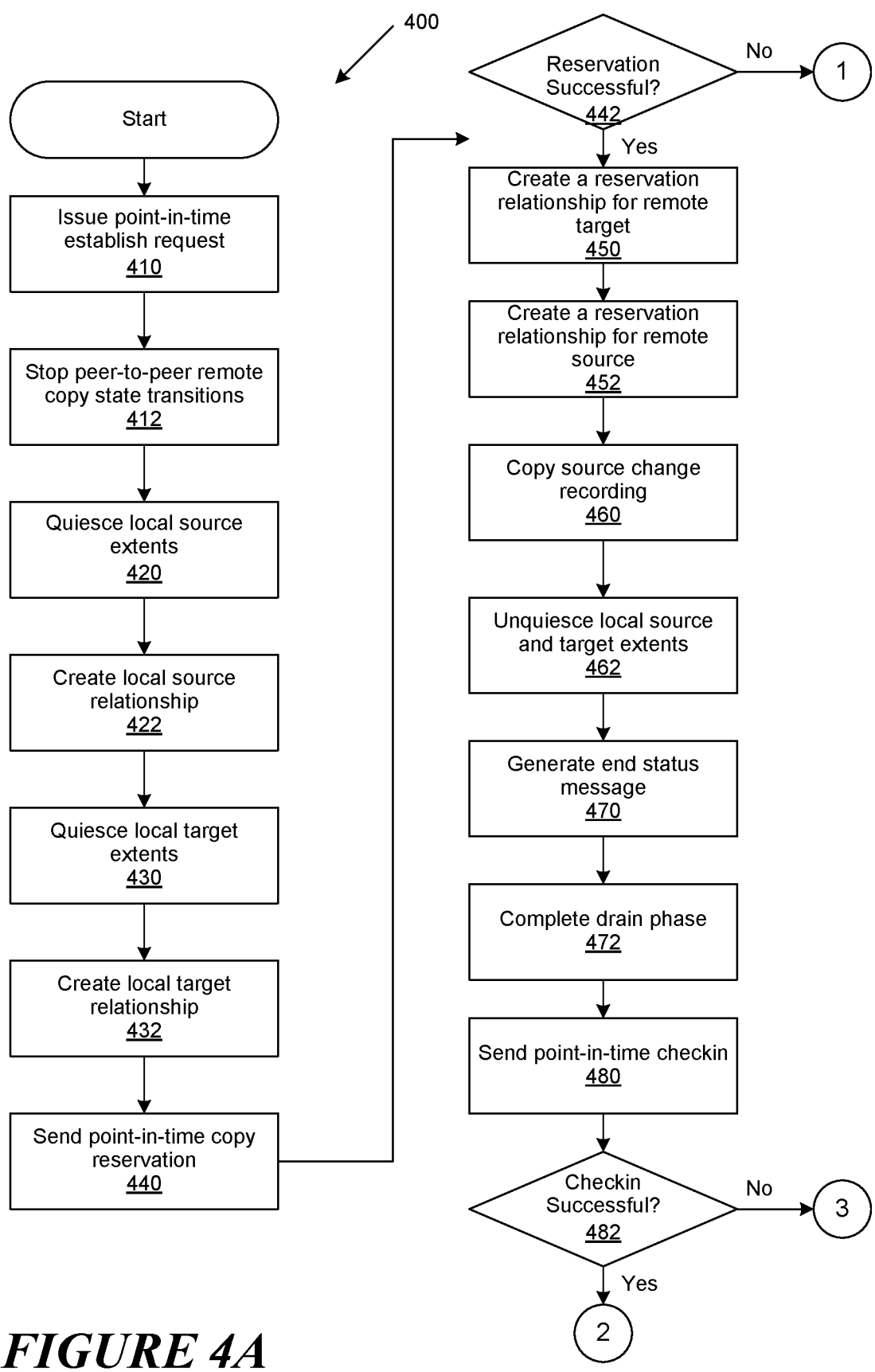
FIGS. 4A and 4B, generally referred to as FIG. 4, are generalized flowcharts of a point-in-time reservation based copying operation.
Figure 4B:
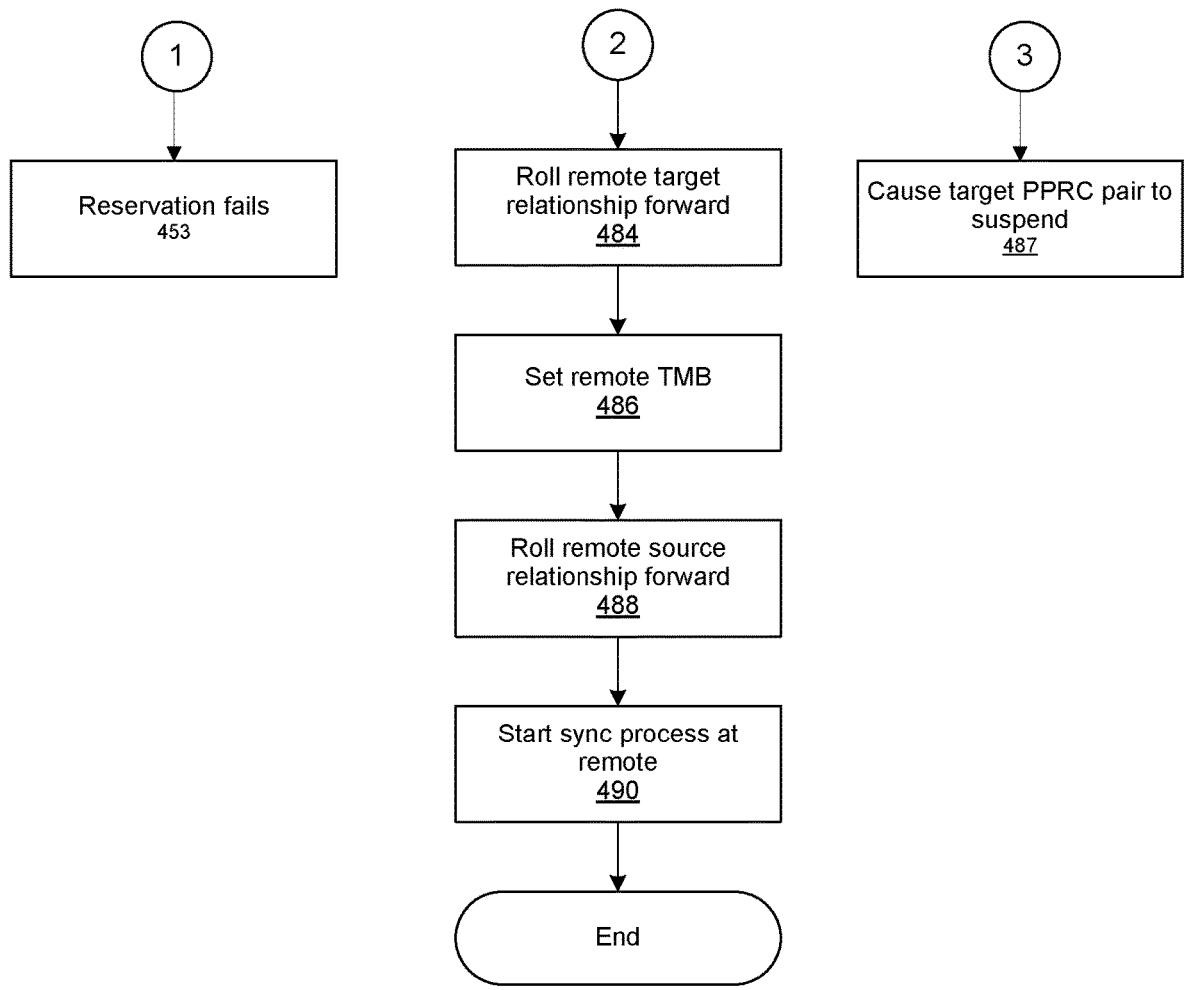

FIG. 4 is a generalized flowchart of a point-in-time reservation based copy operation 400 performed within an asynchronous data mirroring environment implemented in accordance with an embodiment of the invention. More specifically, the point-in-time reservation based operation 400 begins at step 410 with a point-in-time establish request being issued to the local controller (e.g., primary storage controller 204). Next, at step 412, the point-in-time data mirroring system 150 stops peer-to-peer remote copy state transitions on the local source (e.g., the first primary volume 206) and the local target (e.g., the second primary volume 208).

Next, the point-in-time data mirroring system 150 creates a local source relationship between the local first primary volume and the local second primary volume. More specifically, the point-in-time data mirroring system 150 quiesces the local source extents (e.g., the local volumes being copied to the second primary volume) at step 420. Next at step 422 the point-in-time mirroring system 150 creates a local source relationship. Next, at step 430, the point-in-time data mirroring system 150 quiesces the local target extents and creates a local target relationship at step 432.

The point-in-time data mirroring system 150 then sends a point-in-time copy reservation to the remote controller (e.g., the secondary storage controller 214) at step 440 and determines whether the point-in-time reservation was successful at step 442. If the point-in-time reservation was successful, then the point-in-time data mirroring system 150 creates a reservation relationship for the remote target at step 450 and a reservation relationship for the remote source at step 452. If not successful, then the reservation fails at step 453

After creating the remote source relationship, the point-in-time data mirroring system 150 copies the source change recording to the target change recording for the identified extent ranges (e.g., for the volumes to be copied) at step 460 and unquiesces the local source and target extents at step 462. Next at step 470, the point-in-time data mirroring system 150 generates an end status message that is provided to the host (e.g., the primary host system 202) for the point-in-time copy operation to complete. Next, at step 472, the consistency group finishes the drain phase indicating that the increment is complete (i.e., that the current point-in-time copy operation completed operation).

At step 480, the point-in-time data mirroring system 150 sends a point-in-time check-in message to the remote (e.g., to the secondary storage controller 214) check-in. I.e., the point-in-time reservation based operation 400 waits for the global mirror operation to complete the "draining" phase before issuing the check-in message to the remote. The check-in message then informs the remote that the point-in-time relationship can "roll forward" or start at that point. Essentially, the check-in message defines the "Point-in-time" because the system knows that the data has drained to the remote and thus can be "checked in." For the purposes of this disclosure, a check-in refers to changing the reservation relationship into a "real" flashcopy relationship (i.e., the remote target has a logical copy of the remote source at this instant). After checking in, the point-in-time data mirroring system 150 can set a target bit map. The point-in-time data mirroring system 150 then determines whether the check-in was a success at step 482. If the check-in was a success then the point-in-time data mirroring system 150 rolls the remote target relationship forward at step 484, sets the remote target bit map (TBM) at step 486 and rolls the source relationship forward at step 488. While the point of the reservation operation is to ensure a check-in won't fail, there is a chance a failure can happen (i.e., the check-in was not successful), in this case, the point-in-time data mirroring system 150 causes the target PPRC pair 208, 218 to suspend at step 487.

Next at step 490 the point-in-time data mirroring system 150 starts the synchronization process at the remote.

Figure 5A:
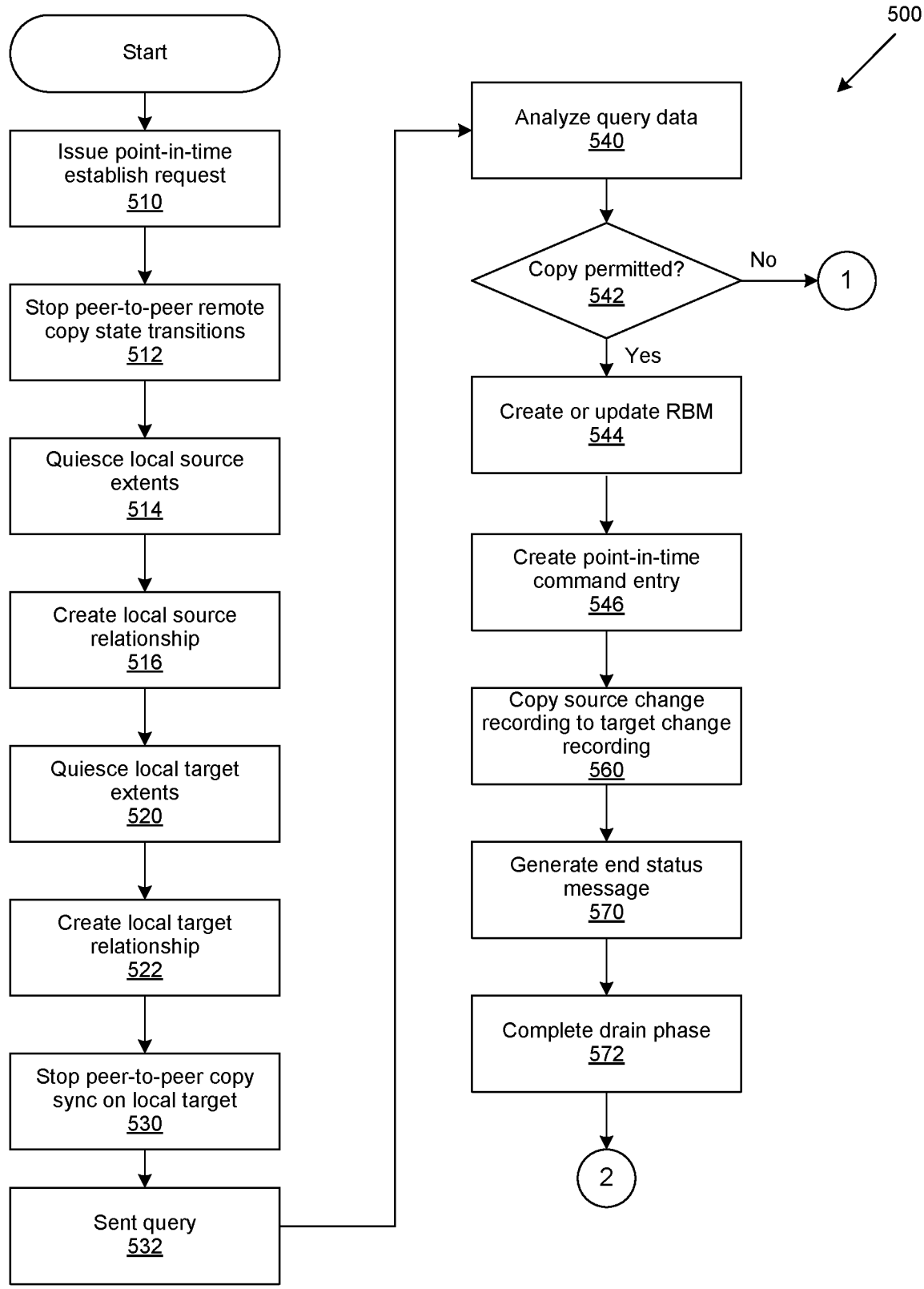
FIGS. 5A and 5B, generally referred to as FIG. 5, are generalized flowcharts of a point-in-time non-reservation based operation.
Figure 5B:
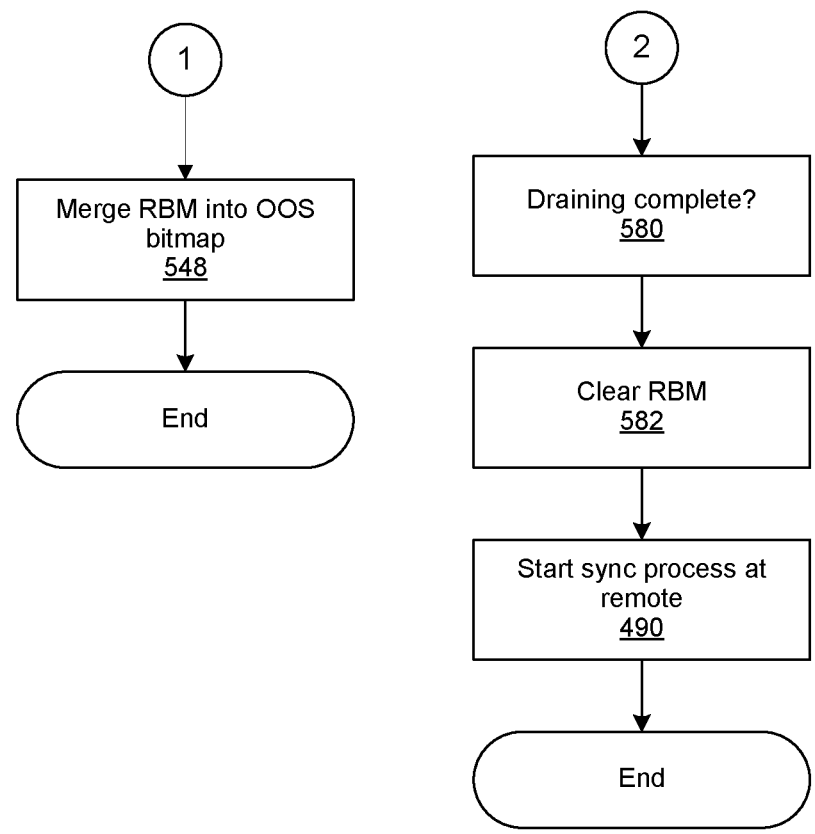

FIG. 5 is a generalized flowchart of a point-in-time non-reservation based copy operation 500 performed within an asynchronous data mirroring environment implemented in accordance with an embodiment of the invention. More specifically, the point-in-time non-reservation based operation 500 begins at step 510 with a point-in-time establish request being issued to the local controller (e.g., primary storage controller 204). Next, at step 512, the point-in-time data mirroring system 150 stops peer-to-peer remote copy state transitions on the local source (e.g., the first primary volume 206) and the local target (e.g., the second primary volume 208). Next, at step 514, the point-in-time data mirroring system 150 quiesces local source extents. Next, at step 516, the point-in-time data mirroring system creates a local source relationship (e.g., between the local first primary volume and the local second primary volume).

Next, at step 520, the point-in-time data mirroring system 150 quiesces the local target extents. The point-in-time data mirroring system 150 then creates a local target relationship at step 522. Next, at step 530 the point-in-time data mirroring system 150 stops peer-to-peer remote copy synchronization on the local target (e.g., the second primary volume 208). Next, the point-in-time data mirroring system 150 sends a FlashCopy Capability query (e.g., a 0x47 query) to the secondary storage controller 214 at step 532. More specifically, a user can issue a command with extent ranges and intent of these extent ranges to be source or target. The FlashCopy Capability query returns whether that relationship can be created.

Next at step 540, the point-in-time data mirroring system 150 analyzes the query data. If at step 542 the point-in-time data mirroring system 150 determines that a point-in-time copy operation is permitted and the relations bits are not already set in the Relations BitMap (RBM) 242, then the point-in-time data mirroring system 150 creates or updates the Relations BitMap 242 for the point-in-time tracks at step 544. The Relations BitMap 242 is a bitmap that is used to track establish operations in progress. More specifically, the Relations BitMap has a bit for every track in a volume. Each set bit in the Relations BitMap represents what tracks are already committed to a future remote flashcopy relationship. Essentially, setting a bit in the Relations BitMap provides a way to reserve a relationship. If the bit is set, this means that system cannot use that track in another relationship. When an establish message is received, the establish operation sets a range of bits for the source and target. When the point-in-time command is complete after consistency group formation, the Relations BitMap is reset.

Next the point-in-time data mirroring system 150 creates a point-in-time command entry in the point-in-time Command Buffer 240 at step 546 and control returns to the local controller. If at step 542, the point-in-time data mirroring system 150 determines that a copy is not permitted such as when a point-in-time operation is not permitted or the bits are not already set in the Relations BitMap 242, then the point-in-time data mirroring system 150 merges the Relations BitMap 242 into the OOS bitmap and clears out the pending FLC commands in the FLC Command Buffer at step 548 and the point-in-time non-reservation copy operation completes operation. More specifically, the system sets the OOS bitmap for volume 208 for the range of tracks that were in the flashcopy relationship. This ensures that all the correct data is copied to the secondary. The RBM is on the remote and is not be used when step 542 fails.

After creating the point-in-time command entry, the point-in-time data mirroring system 150 copies the source change recording to the target change recording for the extent ranges at step 560. The extent ranges are used in the local source and target relationship. Next at step 570 the point-in-time data mirroring system 150 generates and end status message that is provided to the secondary host 212 for the point-in-time complete. Next, at step 572, the consistency group finishes the drain phase indicating that the global mirror has completed the consistency group.

Next at step 580, when the draining has completed (i.e., the consistency group has either been created or failed), the point-in-time data mirroring system 150 then clears the relations bitmap 242 at step 582.

Next at step 590 the point-in-time data mirroring system 150 starts the synchronization process at the remote.

Although the present invention has been described in detail, it should be understood that various changes, substitutions and alterations can be made hereto without departing from the spirit and scope of the invention as defined by the appended claims.

What is claimed is:

1. A computer-implemented method for data mirroring, comprising:
   receiving a request to initiate an asynchronous data mirroring operation associated with a first point-in-time copying process;
   processing first establish data to generate a point-in-time establish reservation, the first establish data associated with the first point-in-time copying process establish;
   using the point-in-time establish reservation to generate second establish data if the second point-in-time copying process can be performed; and
   using the second establish data to initiate a second point-in-time copying process; and,
   tracking establish operations in progress between the first point-in-time copying process and the second point-in-time copying process; and wherein
   the asynchronous data mirroring operation comprises a draining phase and an idle phase, during the draining phase a consistency group is in progress and the idle phase corresponds to when volumes in a session are being copied via the asynchronous data mirroring operation.

2. The method of claim 1, wherein:
   when a first point-in-time copy establish operation is performed based upon the first establish data, a second point-in-time copy establish operation is prevented from being performed if the asynchronous data mirroring operation is in the process of draining a consistency group (CG).

3. The method of claim 1, wherein:
   the point-in-time establish reservation is assigned a point-in-time copy sequence number configured to coordinate a corresponding point-in-time copying process establish check-in.

4. The method of claim 1, wherein:
   the point-in-time establish reservation is synchronously established with the first point-in-time copying process establish.

5. The method of claim 4, wherein:
   the point-in-time establish reservation is synchronously established over a Peer-To-Peer Remote Copy (PPRC) link.

6. A system comprising:
   a processor;
   a data bus coupled to the processor; and
   a computer-usable medium embodying computer program code, the computer-usable medium being coupled to the data bus, the computer program code used for data mirroring and comprising instructions executable by the processor and configured for:
   receiving a request to initiate an asynchronous data mirroring operation associated with a first point-in-time copying process;
   processing a first set of establish data to generate a point-in-time establish reservation, the first set of establish data associated with the first point-in-time copying process establish;
   using the point-in-time establish reservation to generate a second set of establish data if the second point-in-time copying process can be performed;
   using the second set of establish data to initiate a second point-in-time copying process; and,
   tracking establish operations in progress between the first point-in-time copying process and the second point-in-time copying process; and wherein
   the asynchronous data mirroring operation comprises a draining phase and an idle phase, during the draining phase a consistency group is in progress and the idle phase corresponds to when volumes in a session are being copied via the asynchronous data mirroring operation.

7. The system of claim 6, wherein:
   when a first point-in-time copy establish operation is performed based upon the first establish data, a second point-in-time copy establish operation is prevented from being performed if the asynchronous data mirroring operation is in the process of draining a consistency group (CG).

8. The system of claim 6, wherein:
   the point-in-time establish reservation is assigned a point-in-time copy sequence number configured to coordinate a corresponding point-in-time copying process establish check-in.

9. The system of claim 6, wherein:
   the point-in-time establish reservation is synchronously established with the first point-in-time copying process establish.

10. The system of claim 9, wherein:
    the point-in-time establish reservation is synchronously established over a Peer-To-Peer Remote Copy (PPRC) link.

11. A non-transitory, computer-readable storage medium embodying computer program code, the computer program code comprising computer executable instructions configured for:
    receiving a request to initiate an asynchronous data mirroring operation associated with a first point-in-time copying process;
    processing a first set of establish data to generate a point-in-time establish reservation, the first set of establish data associated with the first point-in-time copying process establish;
    using the point-in-time establish reservation to generate a second set of establish data if the second point-in-time copying process can be performed;
    using the second set of establish data to initiate a second point-in-time copying process; and,
    receiving a request to initiate an asynchronous data mirroring operation associated with a first point-in-time copying process; and wherein the asynchronous data mirroring operation comprises a draining phase and an idle phase, during the draining phase a consistency group is in progress and the idle phase corresponds to when volumes in a session are being copied via the asynchronous data mirroring operation.

12. The non-transitory, computer-readable storage medium of claim 11, wherein:
when a first point-in-time copy establish operation is performed based upon the first establish data, a second point-in-time copy establish operation is prevented from being performed if the asynchronous data mirroring operation is in the process of draining a consistency group (CG).

13. The non-transitory, computer-readable storage medium of claim 11, wherein:
the point-in-time establish reservation is assigned a point-in-time copy sequence number configured to coordinate a corresponding point-in-time copying process establish check-in.

14. The non-transitory, computer-readable storage medium of claim 11, wherein:
the point-in-time establish reservation is synchronously established with the first point-in-time copying process establish.

15. The non-transitory, computer-readable storage medium of claim 14, wherein:
the point-in-time establish reservation is synchronously established over a Peer-To-Peer Remote Copy (PPRC) link.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *